3,729,545
PROCESS FOR PRODUCING A BORAX SOLUTION
Marcel Castin and Paul Demilie, Brussels, Belgium, assignors to Societa Chimica Larderello S.p.A., Milan, Italy
Filed Apr. 14, 1971, Ser. No. 133,827
Claims priority, application Belgium, Apr. 21, 1970, 88,039
Int. Cl. C01b 15/12, 35/00
U.S. Cl. 423—280                                3 Claims

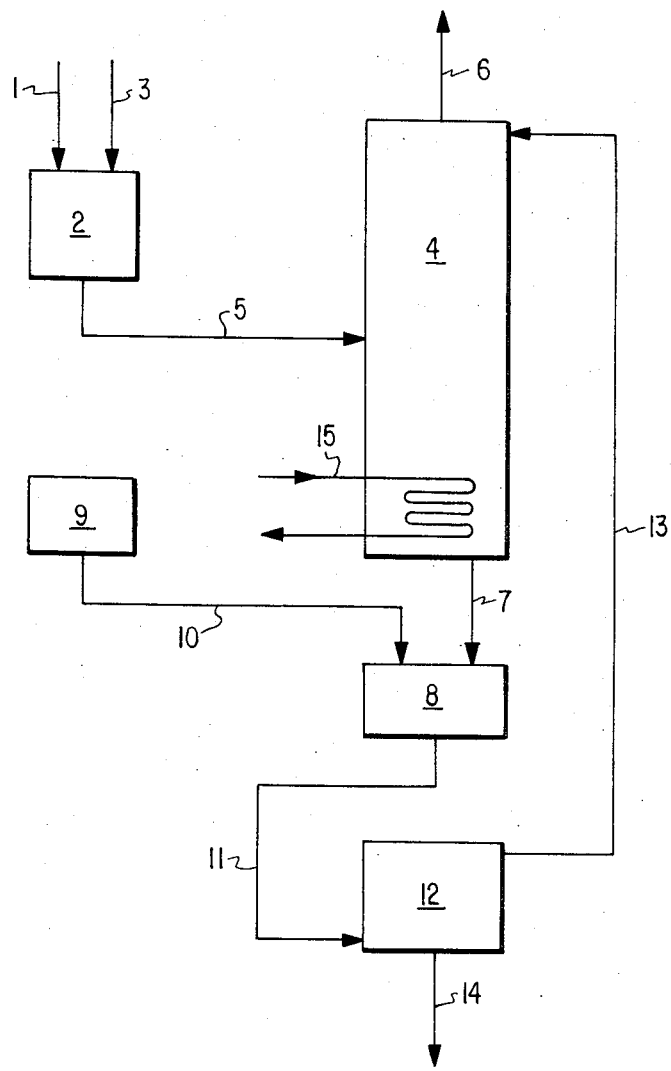

ABSTRACT OF THE DISCLOSURE

A process for the production of aqueous solutions of borax which can be directly used to crystallize penta-and/or decahydrated borax. Used are a source of alkaline $Na_2O$ in the form of hydroxide, carbonate and/or bicarbonate of sodium, and clear aqueous solutions of ammonium borate which are produced by treating boron and calcium minerals with ammonia and carbon dioxide. These solutions are introduced in a distillation column where the ammonium borates are decomposed under heat to produce a solution which is practically free of ammonia. For this purpose, there are successively introduced in this column:
the clear aqueous solution of ammonium borates
at least 50% of the quantity of alkaline $Na_2O$ which is stoichiometrically required to convert the ammonium borates into borax. The remaining portion of alkaline $Na_2O$ which is stoichiometrically required is thereafter introduced in the form of sodium hydroxide into the solution which has been collected at the bottom of the column. In this manner there is obtained an aqueous solution of borax which can directly be used to crystallize penta-and/or decahydrated borax by any known means. By stoichiometric quantity of alkaline $Na_2O$ is meant 1 mole of $Na_2O$ per 2 moles of $B_2O_3$, i.e. the composition of borax: $Na_2O \cdot 2B_2O_3$ or $Na_2B_4O_7$.

BACKGROUND OF THE INVENTION

The present invention relates to a process for converting into aqueous solutions of borax, the clear aqueous solutions of ammonium borates which are obtained when treating minerals of boron and calcium with ammonia and $CO_2$.

These aqueous solutions of ammonium borates are a well known intermediate used on an industrial basis to produce borax and boric acid. They contain unreacted ammonium carbonate.

It is known that it is possible to convert these ammonium borate solutions into borax by adding sodium chloride as proposed in Swiss Patent No. 341,803, filed May 13, 1959, in the name of Enrico Asseo. There is obtained in this manner an aqueous solution from which a borax can be crystallized by cooling and adjustment of the pH with ammonia. In order to satisfactorily operate this process on an industrial basis, the ammonia which is used at the start must be recovered. However ammonia remains combined in solution in the form of ammonium chloride and consequently there must be provided an additional plant for separating and decomposing ammonium chloride.

A much more simple way to treat ammonium borate solutions is to heat and decompose for directly evolving ammonia and $CO_2$, and to concentrate the resulting solutions in order to finally obtain a boric acid solution which is practically free of ammonia and $CO_2$. Such a process is described in German Pat. No. 1,217,933, filed May 10, 1960, in the name of Larderello. This process enables the direct recovery of ammonia and $CO_2$ which can thereafter be recycled to treat the mineral. To obtain borax, caustic soda or sodium carbonate could be added to the solution of boric acid as it is suggested in German Pat. No. 71,310, filed June 14, 1892, in the name of Chemische Fabrik Bettenhausen. However, in the latter case, the solution which is obtained contains $CO_2$. This series of operations is however too complicated to be carried out on an industrial basis. Furthermore, there must be provided special equipment, for example one which is made of stainless steel, and which is resistant to boric acid solutions when the latter are heated to a temperature high enough to decompose ammonium borate.

SUMMARY OF THE INVENTION

An object of the present invention, therefore, is to overcome the disadvantages of the processes aforementioned.

It is another object of the present invention to provide a simple and efficient means to directly convert, in a single step, aqueous solutions of ammonium borates into aqueous solutions of borax practically free of ammonia, the latter being recovered and capable of being used again to treat the mineral.

These as well as other objects which will become apparent in the discussion that follows are achieved, according to the present invention, by a process for the production of aqueous solutions of borax which can be directly used to crystallize penta-and/or decahydrated borax. Such solutions are obtained from a source of alkaline $Na_2O$ in the form of hydroxide, carbonate and/or bicarbonate of sodium, and clear aqueous solutions of ammonium borate which are produced by treating boron and calcium minerals with ammonia and carbon dioxide. The borate solutions are introduced into a distillation column where the ammonium borates are decomposed under heat to produce a solution which is practically free of ammonia. For this purpose, there are successively introduced into this column:

(1) The clear aqueous solution of ammonium borates, and (2) At least 50% of the quantity of alkaline $Na_2O$ which is stoichiometrically required to convert the ammonium borates into borax.

The remaining portion of alkaline $Na_2O$ which is stoichiometrically required is thereafter introduced in the form of sodium hydroxide into the solution which has been collected at the bottom of the column. In this manner there is obtained an aqueous solution of borax which can directly be used to crystallize penta-and/or decahydrated borax by any means known per se.

By stoichiometric quantity of alkaline $Na_2O$ is meant 1 mole of $Na_2O$ per 2 moles of $B_2O_3$, i.e. the composition of borax: $Na_2O \cdot 2B_2O_3$ or $Na_2B_4O_7$.

BRIEF DESCRIPTION OF THE DRAWING

The sole figure of the drawings is a process schematic illustrating the process of the present invention.

DESCRIPTION OF THE PREFERRED EMBODIMENTS

It will be noted that the $Na_2O$ which is introduced in the column causes an easier decomposition of ammonium borates. In addition there results a decreased vapor consumption and a lowering of the pressure and of the operating temperature in the column. Furthermore, it is no longer required to have a column completely made of stainless steel.

In accordance with the invention, it is even possible to use a column which is entirely made of ordinary steel, provided the alkaline $Na_2O$ is mixed at least in part with the solution of ammonium borates before the latter is introduced into the column.

It is also possible to devise a column in which the upper portion is made of stainless steel and the lower portion is constructed of ordinary steel. The introduction of alkaline $Na_2O$ is effected at the bottom part of the stainless steel portion.

It is therefore possible according to the invention to introduce the entire portion of alkaline $Na_2O$ which is stoichiometrically required in the column, without meeting serious corrosion problems with ordinary steel. A borax solution which is free of the initial ammonia is retrieved at the foot of the column, which solution can easily be used to crystallize decahydrated borax.

If it is intended to pursue the crystallization until pentahydrated borax is obtained, certain difficulties will be met due to the presence of $CO_2$ in the solution which exits from the column. Purges by withdrawing a part of the mother liquors must be carried out to limit the content of $CO_2$ in the mother liquor used for the crystallization of pentahydrated borax to 20 g. $CO_2$/kg. of solution.

To overcome this disadvantage, it is possible, in accordance with the invention, to introduce in the column a fraction only of the required $Na_2O$, the remaining portion of $Na_2O$ being introduced at the bottom of the column in the form of NaOH.

In this manner, the following results have been obtained starting from an initial solution which contains at the input of the column:

$B_2O_3$: 100 g./kg. of solution
$NH_3$: 30 g./kg. of solution
$CO_2$: 20 g./kg. of solution to which there are added the following quantities of $Na_2O$.

| Conditions | $Na_2O$ introduced in the column | | $CO_2$ in borax solution at the foot of column, g./kg. of solution |
|---|---|---|---|
| | In g./kg. of original solution | In percent with respect to the stoichiometry of borax | |
| No. 1 | 45 | 100 | 9 |
| No. 2 | 37 | 82 | 3 |
| No. 3 | 25 | 55 | 1 |

In practice, it will be realized that the crystallization of pentahydrated borax is not disturbed when the $CO_2$ content at the bottom of the column remains lower than 3 g./kg. of solution. Preferably, the quantity of $Na_2O$ which is introduced in the column is therefore limited to at most 82% of the entire quantity.

In this manner, for the same quantity of borax which is produced, it is possible while working under the conditions No. 2 to save about 15 to 20% of caustic soda not counting the gains in $B_2O_3$ which is lost during purging when operating under conditions No. 1, i.e. when $Na_2O$ is completely introduced in the column.

However, it will be observed that when introducing less and less alkaline $Na_2O$ in the column, the ordinary steel of the column has an increasing tendency to become corroded, especially at a temperature higher than 100° C.

At 100° C., the quantity of $Na_2O$ which is introduced can vary at will between 50 and 100% of the total charge, and there is practically no corrosion of the ordinary steel.

On the other hand, at 105° C., the speed of corrosion of the ordinary steel remains low (lower than 1 g./m.$^2$ day) as long as there is introduced at least 75% $Na_2O$ in the column. However, corrosion increases rapidly when introducing less $Na_2O$.

In order to prevent using corrosion inhibitors or stainless steel, and to facilitate to the maximum the decomposition of ammonium borate while recovering a minimum amount of $CO_2$ at the bottom of the column, it is recommended, in accordance with the invention, to introduce in the column not less than half the required amount of $Na_2O$.

To prevent an accumulation of $CO_2$ in the crystallization cycle, it is also interesting to charge the crystallization mother liquors with the solution of ammonium borates to the head of the column.

In this case, it is obviously required to take into account the quantity of $Na_2O$ which is brought in the mother liquors in order to calculate the quantity of $Na_2O$ to be introduced in the column. This operation enables a decrease in the purgings of the mother liquors.

The solutions of borate which are obtained in accordance with the invention can then be used directly for the crystallization of deca-and/or pentahydrated borates by any means known per se.

Further illustrative of the present invention is the following example:

Referring to the sole figure of the drawing, a clear aqueous solution of ammonium borates is introduced through pipeline 1 into continuously operatnig mixer 2 The composition of this aqueous solution is as follows:

|  | G./kg. |
|---|---|
| $B_2O_3$ | 100 |
| $NH_3$ | 30 |
| $CO_2$ | 20 |

Additionally introduced into mixer 2 through chute 3 is powdered sodium carbonate in sufficient quantity to provide a $Na_2O$ concentration of 33 grams per kilogram of original solution or 75% of the $Na_2O$ with respect to the stoichiometry of borax. The resulting solution is continuously charged at a temperature of 100° C. to distillation column 4 through pipeline 5. The distillation column contains 40 bubblecap trays, the solution being charged at the 1st tray from the top. The length of the column is 6 meters. The steel used for construction of column 4 had the following composition: 0.20 wt.-percent C., 0.50 wt.-percent Mn, remainder Fe. The composition of the vapor obtained through pipeline 6 is as follows, on a weight basis:

|  | Percent |
|---|---|
| $NH_3$ | 3.7 |
| $CO_2$ | 5.2 |
| $H_2O$ | 91.1 |

The temperature of this vapor is 100° C. The liquid leaving through pipeline 7 at 105° C. and flowing into mixer 8 has the following composition:

|  | G./kg. |
|---|---|
| $B_2O_3$ | 100 |
| $Na_2O$ | 33 |
| $CO_2$ | 2 |

Vessel 9 contains a 50% solution of NaOH, which is fed through pipeline 10 to mixer 8 in sufficient quantity to provide a solution having the stoichiometry of borax.

The resulting solution which has the following composition:

|  | G./kg. |
|---|---|
| $B_2O_3$ | 97 |
| $Na_2O$ | 43.5 |
| $CO_2$ | 2 | is fed through pipeline 11 to a Howard crystallizer of the type illustrated in FIGS. 17–19 appearing on page 17–16 of Perry's "Chemical Engineers' Handbook," 4th ed., McGraw-Hill Book Company. With pH being held at 9.5 and temperature of the mother liquor leaving through pipeline 13 equaling 10° C., crystals of decahydrated borax are recovered through pipeline 14. Heat is introduced to the liquid in the bottom of the column 4 through steam circuit 15. On a weight basis, the following ratios of the flow rates in the pipelines were used:

Pipeline 6/pipeline 5=0.77
Pipeline 13/pipeline 5=0.83
Pipeline 7/pipeline 5=1.05

The pressure in the column 4 was atmospheric.

The column 4 was observed to corrode at a speed of only about 0.5 g./m.² day.

It will be understood that the above description of the present invention is susceptible to various modifications, changes and adaptations, and the same are intended to be comprehended within the meaning and range of equivalents of the appended claims.

We claim:

1. A process for the production of borax, comprising the steps of charging an ordinary-steel distillation column with a clear aqueous solution containing $B_2O_3$ and $NH_3$ and with at least 50%, and up to 100%, of the quantity of alkaline $Na_2O$ in the form of at least one material selected from the group consisting of the hydroxide, carbonate, and bicarbonate of sodium which would be required to convert all the $B_2O_3$ to $Na_2O \cdot 2B_2O_3$, operating the distillation column for removing $NH_3$ to yield an aqueous solution free of $NH_3$ at the bottom of the column, adding to the solution obtained at the bottom of the column any additional $Na_2O$, in the form of sodium hydroxide, needed for converting all of the $B_2O_3$ to $$Na_2O \cdot 2B_2O_3,$$

and crystallizing from the resulting NH-free, $Na_2O \cdot 2B_2O_3$ solution a borax selected from the group consisting of deca- and pentahydrated borax.

2. A process as claimed in claim 1, further comprising the step of charging mother liquors, which remain after the step of crystallizing, to the head of the distillation column.

3. A process for the production of borax, comprising the steps of charging an ordinary-steel distillation column with a clear aqueous solution containing $B_2O_3$ and $NH_3$ and with at least 50%, and at most 82%, of the quantity of alkaline $Na_2O$ in the form of at least one material selected from the group consisting of the hydroxide, carbonate, and bicarbonate of sodium which would be required to convert all the $B_2O_3$ to $Na_2O \cdot 2B_2O_3$, operating the distillation column for removing $NH_3$ to yield an aqueous solution free of $NH_3$ at the bottom of the column, adding to the solution obtained at the bottom of the column sufficient additional $Na_2O$, in the form of sodium hydroxide, that all of the $B_2O_3$ is converted to $$Na_2O \cdot 2B_2O_3,$$

and crystallizing from the solution resulting from the step of adding a borax selected from the group consisting of deca- and pentahydrated borax, in which process the crystallizing is not disturbed by the presence of $CO_2$ in the solution yielded at the bottom of the column.

References Cited

UNITED STATES PATENTS

| | | | |
|---|---|---|---|
| 1,450,975 | 4/1923 | Kelly | 23—59 |
| 2,867,502 | 1/1959 | Stange et al. | 23—59 |
| 3,018,163 | 1/1962 | May et al. | 23—59 |

HERBERT T. CARTER, Primary Examiner

U.S. Cl. X.R.

203—33, 36, 37